United States Patent [19]

Garren et al.

[11] Patent Number: 5,073,347
[45] Date of Patent: Dec. 17, 1991

[54] UNITARY VOLUMETRIC PIPETTE AND METHOD FOR MAKING THE SAME

[75] Inventors: Ralph F. Garren, Chatsworth; Ara Martirosian, Woodland Hills, both of Calif.

[73] Assignee: Beral Enterprises, Inc., Chatsworth, Calif.

[21] Appl. No.: 554,300

[22] Filed: Jul. 17, 1990

[51] Int. Cl.⁵ .............................................. B01L 3/02
[52] U.S. Cl. ................................ 422/100; 73/864.01; 73/864.11; 73/864.14; 425/577
[58] Field of Search .................. 422/100; 73/864.01, 73/864.11, 864.14; 425/577; 264/250; 156/304.1

[56] References Cited

U.S. PATENT DOCUMENTS

| | | | |
|---|---|---|---|
| Re. 31,555 | 1/1984 | Garren et al. | 73/864.11 |
| 3,608,146 | 10/1968 | Dunipace | 425/302.1 |
| 3,834,241 | 12/1974 | Garren et al. | 73/864.11 |
| 4,212,204 | 4/1980 | St. Amand | 73/864.11 |
| 4,563,104 | 11/1986 | Saint-Amand | 401/139 |
| 4,779,768 | 7/1988 | St. Amand | 222/209 |

FOREIGN PATENT DOCUMENTS

| | | | |
|---|---|---|---|
| 3016594 | 11/1981 | Fed. Rep. of Germany | 422/100 |
| 6099630 | 8/1981 | Japan | 422/100 |

Primary Examiner—Robert J. Warden
Assistant Examiner—Laura E. Collins
Attorney, Agent, or Firm—Fulwider, Patton, Lee & Utecht

[57] ABSTRACT

A unitary volumetric pipette for dispensing liquids is formed as a unitary structure made from components that have been precision made by an injection molding process and which are bonded together to create an extremely precision fluid dispensing device. The pipette includes a stem portion which is separately formed in an injection molding process and which is bonded, usually through heat bonding, to a bulb portion to complete the pipette. The bond between these two components is sufficiently strong to prevent separation of the pieces and is waterproof to prevent any leakage of fluid from the bulb portion.

15 Claims, 2 Drawing Sheets

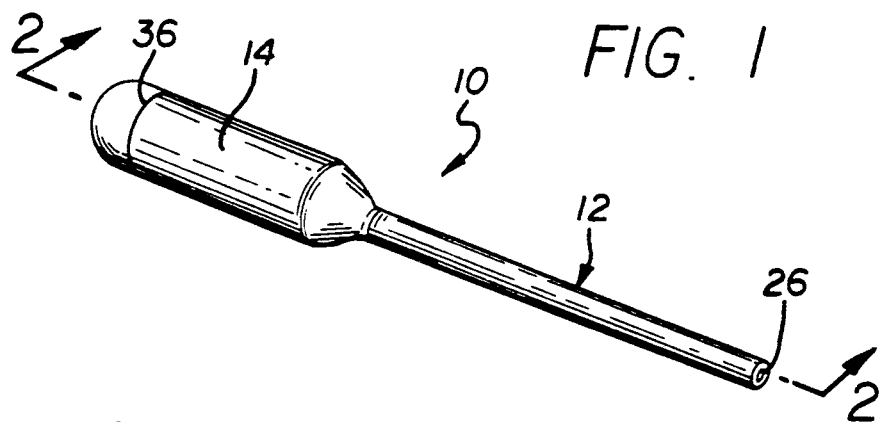
FIG. 1
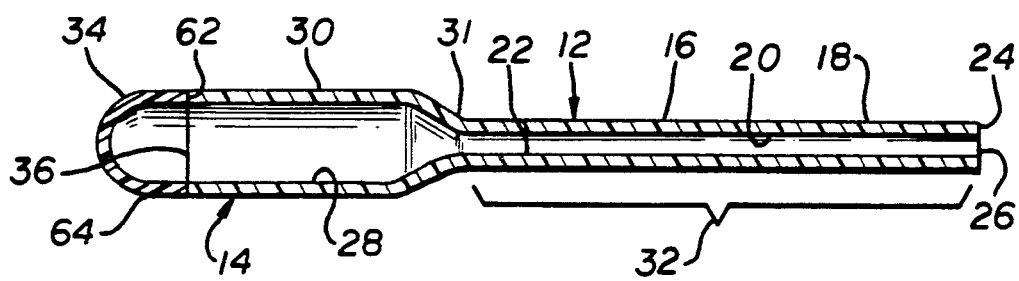
FIG. 2
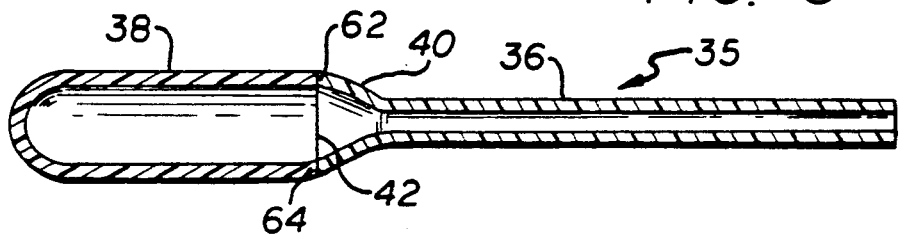
FIG. 3
FIG. 4 PRIOR ART

UNITARY VOLUMETRIC PIPETTE AND METHOD FOR MAKING THE SAME

BACKGROUND OF THE INVENTION

1. Field of the Invention

The present invention relates generally to fluid dispensing pipettes and, more particularly, to a unitary volumetric pipette formed from separate injection molded components joined together to create a precision fluid delivery device which is capable of dispensing an extremely accurate amount of liquid. The invention is also directed to a method for making this unitary volumetric pipette.

2. Description of the Prior Art

Pipettes are well-known devices which are designed to dispense measured quantities of liquids, particularly in uniform drops of a given volume. Pipettes have had widespread usage in a number of industries where accurate measurement and delivery of fluids are required, particularly the medical and laboratory testing and analysis fields.

Numerous types of pipettes have been proposed and developed throughout the years. Most rely on a construction which includes a narrow tube or stem into which the liquid is drawn. A flexible bulb, usually made from rubber or a similar flexible material, is connected to the stem to produce a vacuum when the bulb is squeezed to draw the liquid into the stem. Once fluid is drawn into the stem, it will remain there until the bulb is again squeezed by the user to release some or all of the fluid. By carefully manipulating the bulb, a user can generally release the fluid a drop at a time. The size or volume of the drop is usually determined by the size of the opening formed at the tip of the stem. The stem may also include calibrations which allow the user to deliver larger measured amounts of liquid at one time.

Early style pipettes were generally made from glass tubing and a flexible rubber bulb attached at one end of the tubing. Advances in plastic forming techniques have resulted in the development of disposable plastic transfer pipettes which prove to be somewhat reliable and eliminate a number of the disadvantages associated with glass pipettes. For example, glass pipettes are susceptible to breakage during transportation from the manufacturer and also during usage which can prove to be detrimental from a cost standpoint. Additionally, there is a potential for contamination in glass pipettes especially if the rubber bulb is interchanged on a number of glass tubings. Also, if the glass tubing is broken, the user is subjected to possible infection or contamination if cut by the broken glass.

Numerous methods for forming distinctive plastic transfer pipettes have thus been developed. For example, in U.S. Pat. No. Re. 31,555 to Garren, a method for creating a plastic pipette consists of a blow molding process in which a heat softened tubing is placed within a mold and expanded by air pressure to force the tubing against the mold to take on its particular shape. Other methods for forming other distinct plastic pipettes are disclosed in U.S. Pat. No. 4,779,768 to St. Amand and U.S. Pat. No. 4,563,104 to St. Amand which also utilize blow molding as the preferred method for forming the pipette. Blow molding, in fact, has been primarily used in the pipette industry since it provides a quick and relatively inexpensive process for mass producing disposable transfer pipettes.

The plastic disposable pipette is formed as a single piece which includes a stem portion and a built-in bulb for drawing the liquid into the stem. This disposable type of pipette has generally been utilized in the industry as a transfer pipette for transferring liquids which do not have to be precisely measured. Generally, a pipette can be classified as either a volumetric pipette or transfer pipette depending upon the accuracy of the delivery of the device. Volumetric pipettes are capable of delivering a much more precise amount of liquid than a simple transfer pipette and, as a result, require more precision in creating the stem portion which defines the chamber which retains and delivers the liquid. For the most part, volumetric pipettes are either manufactured from glass or injection molded plastic which forms the stem portion. The stem of a volumetric pipette is usually open at both ends and thus requires a pipette aid, such as a rubber bulb or similar device, to help draw up the liquid into the stem. Some volumetric pipettes are designed to allow the user to draw the liquid into the pipette through mouth suction. These type of volumetric pipettes can be unsafe since fumes or the liquid itself can be drawn into the user's mouth during usage. Additionally, these types of pipettes are often more expensive to manufacture than the disposable plastic transfer pipette.

The plastic blow molded transfer pipette elminates some of the disadvantages associated with volumetric pipettes since the bulb and stem are formed as a one-piece unit. As a result, there is less chance for the plastic pipette to become contaminated since the bulb portion is incapable of being separated from the stem and thus cannot be interchanged from stem to stem. As mentioned above, the bulb portion, if not permanently affixed to the stem portion, can be interchanged with various stems and can carry with it unwanted fumes or residual liquid from previous uses. Additionally, the built-in bulb portion eliminates the need to use mouth suction to draw the fluid into the stem. This eliminates any potential health risk to the user. Also, since the blow molded pipette is made from a plastic material which can be manufactured quite inexpensively, it is readily disposable and can be utilized for one time usage only. Thus the plastic blow molded transfer pipette has certain distinct advantages over the conventional volumetric pipettes.

While blow molding is the preferred method for producing the disposable plastic transfer pipette, there are serious drawbacks with this particular method which results in a pipette which is unable to deliver an extremely precise amount of liquid. This is attributable to the fact that the inner surface of the pipette, which defines the chamber that holds the fluid, is susceptible to defects and uneven formation during the blow molding process which directly impairs its ability to retain the amount of liquid it is designed to deliver. It should be appreciated that the critical control surface within any pipette, whether it be made from glass or plastic, is the inner surface since this particular surface defines the boundaries of the fluid chamber that stores and measures the fluid. For example, fluctuations in the wall thickness of the stem portion will effect the amount of fluid that can be stored in the fluid chamber and can provide an inaccurate delivery of fluid.

When blow molding methods are employed, air or a gas is forced into the interior of a heat softened tubing which causes the tubing to expand against the surface of the mold to retain its shape. If the air or gas pressure fluctuates within the mold, the wall thickness in the stem portion can vary causing either a larger or smaller fluid chamber to be created in the pipette. Any fluctuations in the wall thickness is detrimental since the pipette will no longer deliver the expected amount of liquid. In some instances, the fluctuation can be as high as ten percent which results in the pipette delivering a less than precise amount of liquid. In some industries, an imprecise delivery of fluid is detrimental and can cause erroneous test results. For this reason, plastic pipettes are generally used for bulk transfer of liquids when precision measurement and delivery are not required.

The formation of the opening at the tip of the stem of a plastic transfer pipette is also susceptible during the blow molding process since the tip can also be irregularly formed. As a result, the precision of the drop size delivered by the pipette can also be effected and can result in an inaccurate delivery of fluid.

As a result of the disadvantages associated with plastic transfer pipettes that are formed by a blow molding process, there is a need for an improved plastic pipette which can provide a more precise and accurate delivery of fluid and yet can still be manufactured inexpensively and quickly. Therefore, there is a need for a pipette and a method for making the same which will eliminate the above-noted disadvantages associated with disposable one-piece plastic pipettes which are now manufactured by blow molding processes.

SUMMARY OF THE INVENTION

The present invention eliminates many of the disadvantages attributable to blow molding processes by providing a volumetric pipette which can dispense an extremely accurate amount of liquid through the use of a precision formed stem portion. In general terms, the present invention is directed to a novel volumetric pipette construction that utilizes two separately formed components bonded together to form a unitary pipette. The stem portion of the volumetric pipette is a separately formed component that is manufactured by an injection molding process which creates a precision piece that is much more accurate in fluid delivery than a stem formed by blow molding techniques. The volumetric pipette includes a hollow deformable bulb which is also formed as a separate piece and is in turn bonded to the stem to create a unitary waterproof fluid dispensing device. This deformable bulb can also be formed utilizing an injection molding process to enhance the precision of the device. As a result of utilizing precision formed components, a pipette made in accordance with the present invention should provide a more accurate device for the dispensing of liquids.

The present invention thus utilizes the advantages of a conventional volumetric pipette (i.e., highly accurate measurement and delivery of fluid) with the advantages associated with a plastic blow molded transfer pipette (i.e., the built-in bulb portion and the cost of manufacture) to produce a superior device for measuring and delivering liquids. The present invention represents a new generation of plastic disposable pipettes which have distinct advantages over prior art devices. The stem portion formed in accordance with the present invention functions like a volumetric pipette yet includes a built-in bulb portion which is incapable of separation. Thus, the problems associated with conventional volumetric pipettes are eliminated utilizing the present structure of the present invention. As a result, a better and safer product can be manufactured.

In one form of the invention, the stem is bonded to the bulb utilizing heat bonding. The bonding of the bulb to the stem creates a weld line which is sufficiently strong to create a water tight seal between the stem and the bulb and to resist possible breakage or separation of the two pieces.

In one particular form of the invention, the stem is formed to include an elongated tubular portion which translates into a first bulbous portion which forms part of the bulb. In this particular form, the elongated tubular section forms the portion of the pipette that measures and stores the fluid for delivery. The elongated tubular section has one end that defines the opening for the pipette and its other end translates into the larger size first bulbous portion. The structure of this particular stem may look somewhat similar to the stem and glass portion of a champagne glass. This first bulbous portion has a larger diameter than the elongated tubular section and is also open at one end. This open end of the first bulbous portion is in turn bonded to a second bulbous portion which cooperates to form the deformable bulb on the pipette. These two bulbous portions can be bonded together in a heat bonding step which again creates a waterproof joint or seal which is virtually unbreakable.

The use of two separate pieces or components that are bonded together creates a unitary volumetric pipette that results in a novel pipette which includes all of the functions of a conventional blow molded plastic transfer pipette except that the present invention can deliver a much more accurate amount of liquid, much like a conventional volumetric pipette.

The features and advantages of the present invention will become more apparent from the foregoing detailed description taken in conjunction with the accompanying drawings which illustrate by way of example the principle of the present invention.

BRIEF DESCRIPTION OF THE DRAWINGS

FIG. 1 is a perspective view of one embodiment of a volumetric pipette made in accordance with the present invention.

FIG. 2 is a cross-sectional view of the volumetric pipette of FIG. 1 taken along line 2—2.

FIG. 3 is a cross-sectional view of another embodiment of the present invention in which the stem is bonded to a second bulbous portion.

FIG. 4 is a cross-sectional view of a typical prior art blow molding apparatus which can be utilized in the formation of a pipette made by blow molding techniques.

DETAILED DESCRIPTION OF THE PREFERRED EMBODIMENTS

Figure 5:
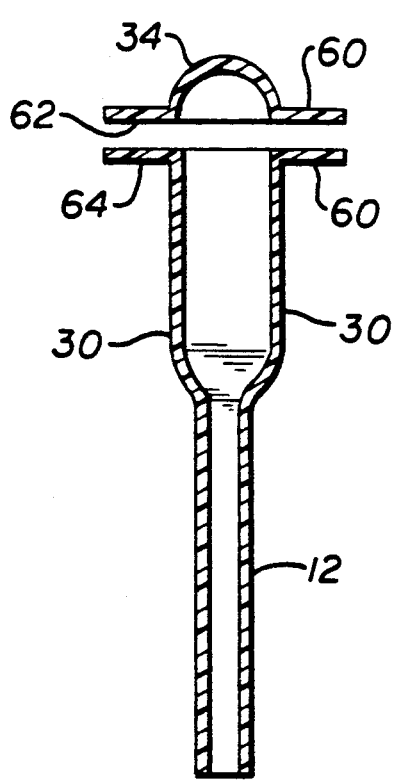
FIG. 5 is a cross-sectional view of the stem and bulb which are formed by an injection molding process showing the components before they are bonded together.

The present invention provides a novel approach in manufacturing a unitary volumetric pipette by bonding two separately formed components together. As a result, the present invention creates a more accurate dispensing device since the separate components can be formed more precisely by utilizing an injection molding process rather than a blow molding process.

FIG. 1 shows one particular embodiment of a volumetric pipette made in accordance with the present invention. The volumetric pipette (10) includes a stem (12) and a bulb (14) located at one end of the stem. The stem (12) is made with a wall (16) which defines a outer surface (18) and an inner surface (20) (see FIG. 2). This inner surface (20) defines the fluid receiving chamber (22) which delivers and retains a predetermined amount of fluid. The tip (24) of the stem includes an opening (26) to the fluid receiving chamber (22) which allows the fluid to be drawn into the stem portion. This fluid receiving chamber (22 is in turn in fluid communication with the hollow interior (28) which is formed and defined by the bulb (14). When the bulb (14) is squeezed, it creates a vacuum which allows fluid to be drawn into the fluid receiving chamber where it remains until the user is ready to release it. A user can simply squeeze the bulb (14) again in order to dispense all or a part of the fluid that is retained within this fluid receiving chamber (22).

The stem (12) shown in FIGS. 1 and 2 includes a first bulbous portion (30) which is formed at the end (31) of the elongated tubular portion (32) of the stem. This first tubular portion (30) and the elongated tubular portion (32) are molded in one piece via an injection molding process to create a precision component. The first bulbous portion (30) is in turn bonded to a second bulbous portion (34) which completes and cooperates with the first bulbous portion to define the deformable bulb (14). As can be seen in FIGS. 1 and 2, a weld line (36) is shown where the first and second bulbous portions are bonded to complete the bulb (14). As will be discussed below, these two components can be bonded through a heat welding process which creates a joint which is waterproof and virtually unbreakable.

The fluid receiving chamber 22 is generally defined a extending along the length of the elongated tubular portion 32 of the pipette. However, it is possible that a portion of the bulb could also define the fluid retaining chamber, especially since the bulb portion, such as the one shown in FIG. 2, is integrally formed with the stem in a precision injection molding process. Alternatively, it is possible to define the fluid receiving chamber as extending along only a portion of the elongated tubular portion. In such a case, the chamber would be delineated by a calibration mark or similar marking on the stem portion. This mark would indicate the particular region of the stem that will deliver the pre-determined amount of fluid. If the bulb portion is also used for delivery of fluid, it too may have a similar marking which would indicate the location of the fluid retaining chamber. It should be appreciated that the stem portion can also be marked with several calibration markings which will indicate to the user the particular amount of fluid which will be delivered when the liquid is level with the particular marking. Such calibration markings are standard on volumetric pipettes and are simply used to dispense different amounts of liquid using this same pipette. The only difference in the present invention is that each calibration marking can be used to dispense an extremely accurate, pre-determined amount of fluid.

Referring now to FIG. 3, an alternative embodiment of the volumetric pipette (35) is shown which includes a stem portion (36) and a bulb (38). In this particular form of the invention, the stem (36) does not include the first bulbous portion as found in the pipette shown in FIGS. 1 and 2, but rather, includes only an outwardly projecting conically shaped region (40) which translates from the stem portion and is bonded to the bulb portion (38). In this particular form, the weld line 42 is much closer to the stem portion than the weld line 36 formed on the pipette depicted in FIGS. 1 and 2. The shape and size of the bulb 38 of FIG. 3 or the bulbous portion 34 of FIG. 2 may vary considerably without departing from the spirit and scope of the invention. Therefore, the location of the weld line is generally dependent upon design considerations. The method for forming this particular embodiment of FIG. 3 along with the embodiment shown in FIGS. 1 and 2 will be further discussed below.

In order to appreciate the advantages of the present invention, reference should be made to the prior art method for forming a disposal plastic pipette. Referring now to FIG. 4, a typical molding apparatus (44) utilized to create a prior art blow molded pipette includes an upper and lower molding section (46) and (48). The upper and lower molding sections (46) and (48) each include a cavity (50) and (52) which defines the shape of the pipette to be blow molded. When the upper and lower molding sections are placed together, the cavity cooperate to form the shape of the particular pipette.

The apparatus (44) includes a blow pin (54) which extends between the upper and lower molding sections 46 and 48 and directly into the mold cavity. The blow pin (54) is provided to direct a source of air or gas into the cavity for pressurization purposes. This pressure source is utilized to blow up a heat softened tubing that is placed within the mold in order to force the material against the mold cavity. The air or gas pressure causes the material to move against the surface to form the pipette. The pipette can then be cooled and released from the mold.

While this blow molding process produces a somewhat accurate dispensing device, the critical inner surface which requires greater control and precision forming is created by exerting air or gas pressure against it. This can sometimes cause the thickness of the wall of the pipette to vary along the stem portion. Although FIG. 4 shows a somewhat exaggerated cross-sectional view of the wall (56) of the pipette, the blow molding process does create variations along the wall (56) of the stem which effects the accuracy of the amount of fluid that is stored within the pipette. As a result, the delivered amount of liquid will differ from the amount that is expected to be dispensed. Also, the size of the opening (58) at the tip of the stem can be effected if the thickness of the wall at that location is uneven or irregular. This will result in the formation of a drop of fluid which will vary from the size that is suppose to be delivered by the pipette.

The problem with the blow molding process is the fact that the critical surface is formed without the benefit of an inner core or mandrel which can accurately regulate the size and shape of the internal surface of the pipette. The lack of a core results in the fluctuations within the wall of the plastic pipette which causes the fluctuations within the fluid receiving chamber.

The present invention eliminates the possibility of fluctuation within the thickness of the wall portion since an injection process is utilized which strictly controls the formation of the internal surface and hence the thickness of the wall within the stem. The internal surface of the pipette made in accordance with the present invention will define a much more accurate fluid retaining chamber since injection molding provides a much more accurate method for forming a precision part than blow molding. When the stem component is formed, a solid core is provided to form the internal surface and to control the internal configuration and size of the stem portion. As a result, the accuracy of the internal surface can be more precisely regulated since a higher degree of precision can be maintained in producing the solid core utilized in the injection molding process. In fact, the core utilized during the injection molding process can maintain the tolerances of the internal fluid receiving chamber. As a result, the overall precision of the pipette is enhanced over prior art blow molded pipettes.

The use of the injection molded process to form the stem portion also allows the engineer or designer to calculate a shrink factor that must be considered in forming a plastic component. Whenever plastic materials are utilized to create the stem portion or the bulbous portion, there exists a certain amount of shrinkage that will result after the component is released from the injection mold. Since the component can be much more easily controlled through the use of a precision mold, the amount of shrink can be taken into account and controlled by the designer. Thus, if the plastic has, for example, a 2% shrinkage after being released from the mold, the mold designer can compensate by creating a mold which will form a component that will shrink down to the desired size. This shrink factor is often not accounted for utilizing blow molding techniques due to the inability to strictly control the wall thicknesses of the pipette. This accounting for the shrink factor is still another benefit associated with the present invention.

Referring now to FIG. 5, the two components which are bonded together to form the unitary volumetric pipette are shown before the bonding process. The two pieces shown in FIG. 5 correspond to the components used to form the volumetric pipette depicted in FIG. 1 and 2. In FIG. 5, it can be seem that the end of the first bulbous portion includes an outwardly projecting flange (60) which is utilized to help maintain the piece within its mold (described below) during the heat bonding process. Also, the second bulbous portion includes a similar type flange (60) which also helps maintain it within its mold as well. The second bulbous portion (34) includes an edge (62) which is bonded to a corresponding edge (64) located on the first bulbous portion. During the heat bonding process (described below), these two ends (62) and (64) are heated to the melting point of the material making up the components in order to allow the two pieces to be compressed and bonded together. In a similar fashion, the pipette shown in FIG. 3 also includes edges (62) and (64) which are bonded together to form the joint or weld (42).

Figure 6:
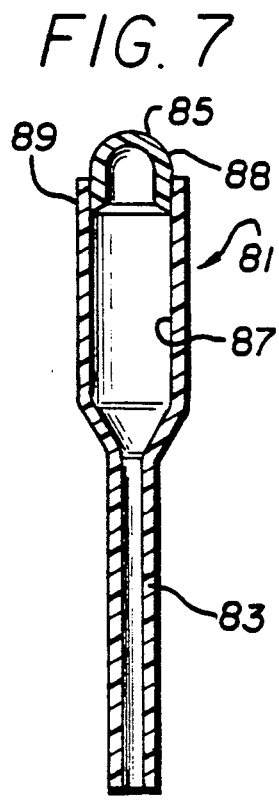
FIG. 6 shows an alternative embodiment of the stem and bulb portions which are formed by an injection molding process.

FIG. 6 shows an alternative embodiment of the two components which can create a distinctly shaped volumetric pipette which would still be made in accordance with the present invention. In this embodiment, the stem portion (72) is shown with steps (74) which gradually tapered down along the length of the stem (72). These steps (74) may represent graduation markers which can be utilized to denote a particular measure of liquid at that particular point on the stem. Also, the stem portion shown in FIG. 6 includes a tapered end (76) which shows that a volumetric pipette manufactured in accordance with the present invention can be formed in a number of different sizes and shapes and still define an extremely precise fluid dispensing device. Since injection molding is utilized to form the opening on the stem as well, a more accurate opening can be formed and accordingly, the size and shape can be varied to produce a drop size of the desired pre-determined volume. Also, the bulb portion (80) shown in FIG. 6 can also be molded to a desired length and shape. For example, the bulb can be made with a "bellows" construction as opposed to the bulb shape shown in the disclosed embodiments. Such a construction of the bulb will not depart from the spirit and scope of the present invention.

Referring still to FIG. 6, the stem portion (72) includes an outwardly projecting flange (82) which is similar to the flange shown in FIG. 5. The bulb portion (80) would also include a similar flange (82). The stem includes an edge (84) which can be heat bonded directly to the edge (86) formed on the bulb portion. Again, this particular embodiment shows just one of the many distinct forms that the pipette can take on.

Figure 7:
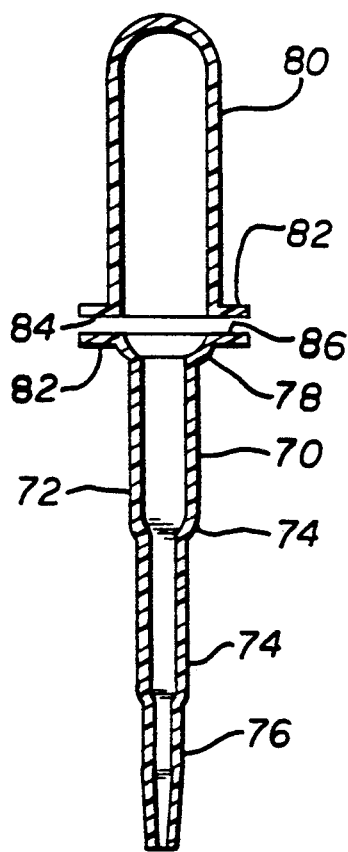
FIG. 7 shows an alternative embodiment of a stem and bulb portion which forms a volumetric pipette made in accordance with the present invention.

Referring now to FIG. 7, an alternative embodiment of a volumetric pipette made in accordance with the present invention is shown. The volumetric pipette 81 is formed with a stem portion 83 which corresponds to the stem portion depicted in FIGS. 1 and 2. This particular embodiment differs from the one shown in FIGS. 1 and 2 in that the second bulbous portion 85 is adapted to fit within the internal cavity 87 formed by the first bulbous portion. This second bulbous portion 85 has an external surface 88 which is designed to form a tight fit with the internal surface of the first bulbous portion. This second bulbous portion, which looks somewhat like a cap, can be manufactured with a wall thickness that is greater than the wall thickness of the stem portion. The weld line 89 is formed along the outer surface of the first bulbous portion to join the two components together to form the integral pipette. The wall thickness of the second bulbous portion is generally greater than the wall thickness of the stem and first bulbous portion since an inward radial force must be applied to the external surface of the first bulbous portion to affect a bond or weld. The extra thickness of this wall will resist the inward radial pressure that is applied during the bonding process. This particular embodiment again creates a water tight seal and achieves the same accurate delivery of liquid which is achieved with all of the other embodiments of the present invention.

Figure 8:
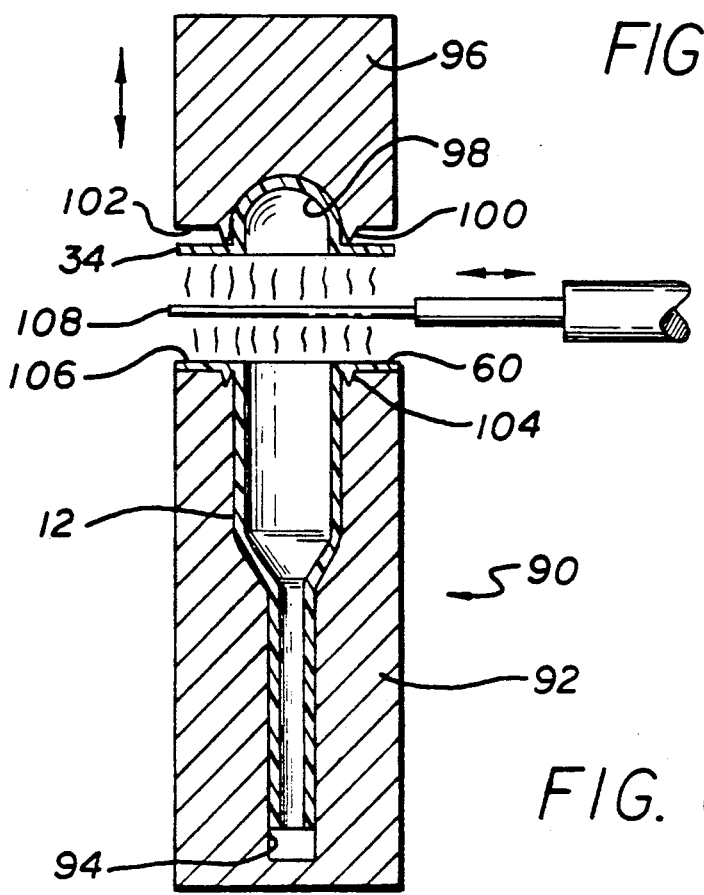
FIG. 8 is a cross-sectional view showing the movable and stationary molds which are utilized along with a heating element to bond the two components to form a volumetric pipette made in accordance with the present invention.

Referring now to FIG. 8, the bonding apparatus (90) which is utilized to bond the components making up the volumetric pipette is shown. The bonding apparatus (90) includes a stationary mold (92) which is adapted to receive one component which makes up the volumetric pipette. In FIG. 8, the stem portion (12) is shown as it is held in a cavity (94) formed in the stationary mold and maintained therein by the flanges (60) that are formed on the stem portion. A movable mold (96) which includes an internal cavity (98) holds the second bulbous portion (34). This internal cavity may utilize a vacuum to maintain the piece within the cavity and prevent it from falling from the mold.

The movable mold (96) also includes a cutting knife (100) which extends from the bottom surface (102) of the mold. The stationary mold has a slot (104) located on the upper wall (106) which is designed to receive the cutting knife (100).

A heat source shown as a movable hot platen (108) is depicted and is movable in the direction essentially perpendicular to the movement of the movable mold. This hot platen (108) is designed to bring the ends of the stem portion and bulb portion to their melting point in order to effect a heat bond between these two components. It should be appreciated that the heating source is shown as a convention heat source, however, any means that will heat the ends of the components to their melting points can also be utilized.

One method for making the volumetric pipette in accordance with the present invention can now be described with reference to FIG. 8. Initially, the two components which are joined together to create the unitary volumetric pipette are first formed through an injection molding operation utilizing injection molding machinery which is well known in the art. The components ca then be placed within the stationary and movable molds of the bonding apparatus. The hot platen can then be moved between the stationary and movable molds in order to properly heat the ends of the two components. Once the ends reach their melting temperature, the platen can then be removed and the movable mold can be moved into contact with the stationary mold. The compression caused by the movable mold causes the melted ends of the two components to mesh and form a joint or weld which is leak proof and virtually unbreakable. The cutting knife of the movable mold will then cut the flange portions and the unitary structure of the volumetric pipette will be formed. Thereafter, depending upon the materials and the thicknesses of the walls of the components, a certain amount of time must be given to allow the weld to cool down and harden. After this occurs, the pipette can be simply released from the mold and will be ready for use.

The method of the present invention can utilize a number of different materials which can be suitably heat bonded together. For example, any suitable polymer or co-polymer can be used. Materials such as polyethelene (low or high density) can also be utilized. Also, polyvinylchloride (PVC), polyproplene and rubber are all suitable low melt materials that can be utilized in accordance with the present invention. Other thermoplastic materials can also be utilized provided the components can be properly bonded together.

The present invention can also utilize materials of different densities for forming the stem portion and the bulb portion. For example, the stem portion can be made from a high density material which allows a stiffer and clearer component to be manufactured. A high density material such as polyethlene is a bit more clearer than low density materials so it could be a suitable material for forming the stem portion. A low density material can then be utilized to form the bulb portion of the pipette since the bulb must be flexible to allow the user to squeeze the bulb to draw the fluid into the stem portion. The number of combinations of different density materials that can be utilized to form the volumetric pipette are numerous and will not depart from the spirit and scope of the invention. The wall thickness of the bulb portion of the pipette is generally between 0.010 to 0.030 inches. The stem portion can also be within this range or it can be thicker depending upon design considerations. It is also possible to vary and utilize different wall thicknesses in the stem portion and bulb portion since the component can now be much more easily controlled through the use of injection molding process.

Generally, the bonding between the two components can be accomplished by heat bonding which allows the melted ends of the components to intermesh and form a bond. It should also be appreciated that these two components could be adhesively bonded together since adhesive or similar material will also form a suitably strong joint.

From the above, it is evident that the present invention provides a novel approach for making a volumetric pipette which eliminates many of the problems associated with disposable plastic transfer pipettes that are manufactured using blow molding technology and conventional two piece volumetric pipettes. The volumetric pipette and the method for making the pipette are superior over the prior art disposable plastic pipettes since the stem portion of the present invention is precision made to provide a much more accurate device for dispensing liquids. While particular forms of the invention have been described and illustrated, it will also be apparent to those skilled in the art that various modifications may be made without departing from the spirit and scope of the invention. Accordingly, it is not intended that the invention be limited, except by the appended claims.

We claim:

1. A volumetric pipette for dispensing fluid comprising:
   an injection molded stem having a wall which forms an elongated tubular portion that defines a fluid receiving chamber formed from a solid core member, said elongated tubular portion having a first end having an opening for said fluid receiving chamber and a second end that translates into forms a first bulbous portion; and
   a second bulbous portion that is bonded to said first bulbous portion, said first and second portion cooperatively defining a deformable hollow bulb that is a communication with said fluid receiving chamber and is adapted to draw fluid into or release fluid from said fluid receiving chamber.

2. The volumetric pipette as defined in claim 1 wherein said first bulbous portion is heat bonded to said second bulbous portion.

3. The volumetric pipette as defined in claim 1 wherein said stem and said second bulbous portion are formed from bondable plastic materials.

4. The volumetric pipette as defined in claim 1 wherein said stem is formed from a material having a different density from said second bulbous portion.

5. The volumetric pipette as defined in claim 4 wherein said stem is made from a high density material and said second bulb is made from a low density plastic material.

6. The volumetric pipette as defined in claim 1 wherein said stem and said second bulbous portion are made from thermoplastic materials.

7. The volumetric pipette as defined in claim 1 wherein said stem and second bulbous portion are made from a low density plastic material.

8. The volumetric pipette as defined in claim 1 wherein said stem and said second bulbous portion are made from heat bondable thermoplastics.

9. The volumetric pipette as defined in claim 1 wherein said first and second bulbous portions have edges that are bonded together.

10. The volumetric pipette as defined in claim 9 wherein said edges are heat bonded together.

11. The volumetric pipette as defined in claim 1 wherein said second bulbous portion is made from an injection molded plastic material.

12. A volumetric pipette for dispensing fluid comprising:

a separately formed injected molded stem having a wall which forms an elongated tubular portion that defines a fluid receiving chamber formed from a solid core member, said elongated tubular portion having one end having an opening for said fluid receiving chamber and a second end that translates into and forms a first bulbous portion; and a second bulbous portion bonded to said first bulbous portion to cooperatively define a hollow deformable bulb which is in communication with said fluid receiving chamber and is adapted to provide vacuum or air pressure to said fluid receiving chamber, said first bulbous portion being bonded to said second bulbous portion to form a leak proof joint between said first and second bulbous portions.

13. The volumetric pipette as defined in claim 12 wherein said leak proof joint is a thermally bonded joint.

14. The volumetric pipette as defined in claim 12 wherein said stem and said second bulbous portion are made from materials having different densities.

15. The volumetric pipette as defined in claim 12 wherein said second bulbous portion is made from an injected molded material.

* * * * *